United States Patent
Yonekawa et al.

(10) Patent No.: US 7,300,579 B2
(45) Date of Patent: Nov. 27, 2007

(54) FLOCCULATION APPARATUS

(75) Inventors: Hitoshi Yonekawa, Nagoya (JP); Nobuhiro Aoki, Nagoya (JP); Naoki Murata, Nagoya (JP)

(73) Assignee: NGK Insulators, Ltd, Nagoya (JP)

( * ) Notice: Subject to any disclaimer, the term of this patent is extended or adjusted under 35 U.S.C. 154(b) by 257 days.

(21) Appl. No.: 10/795,418

(22) Filed: Mar. 9, 2004

(65) Prior Publication Data
US 2004/0178134 A1 Sep. 16, 2004

(30) Foreign Application Priority Data
Mar. 11, 2003 (JP) .............................. 2003-065278
Feb. 4, 2004 (JP) .............................. 2004-027748

(51) Int. Cl.
*C02F 1/52* (2006.01)
(52) U.S. Cl. .................... 210/205; 210/219; 366/174.1; 366/307
(58) Field of Classification Search ................ 210/205, 210/738, 219, 522, 802, 208; 366/340, 174.1, 366/171.1, 307
See application file for complete search history.

(56) References Cited

U.S. PATENT DOCUMENTS

| | | | | |
|---|---|---|---|---|
| 2,424,259 A | * | 7/1947 | Roberts ....................... | 210/523 |
| 2,891,008 A | * | 6/1959 | Weston et al. ............... | 210/208 |
| 4,022,691 A | * | 5/1977 | Heinrich ...................... | 210/202 |
| 4,136,012 A | * | 1/1979 | Louboutin et al. ........... | 210/208 |
| 4,295,973 A | * | 10/1981 | Jain ............................ | 210/738 |
| 5,510,063 A | * | 4/1996 | Gadkaree et al. ........... | 264/29.7 |
| 5,855,781 A | * | 1/1999 | Yorita et al. ............ | 210/321.82 |
| 5,952,079 A | * | 9/1999 | Andou et al. ................ | 428/116 |
| 6,383,422 B1 | * | 5/2002 | Hoffschmidt ................ | 264/44 |
| 6,517,714 B2 | * | 2/2003 | Streat ....................... | 210/195.4 |
| 6,689,277 B2 | * | 2/2004 | Streat ......................... | 210/711 |
| 6,695,967 B2 | * | 2/2004 | Bishop et al. ........... | 210/510.1 |
| 2002/0158025 A1 | * | 10/2002 | Streat ......................... | 210/738 |

FOREIGN PATENT DOCUMENTS

| | | |
|---|---|---|
| DE | 2 311 443 | 9/1974 |
| GB | 1 583 990 | 2/1981 |
| GB | 1583990 A * | 2/1981 |

OTHER PUBLICATIONS

Water supply facility design guideline (2000 edition), Publication office: aggregate corporation Japan Water Association, Issue (second edition): Jun. 2000, pp. 150 and 187-188.

* cited by examiner

*Primary Examiner*—Duane Smith
*Assistant Examiner*—Douglas J. Theisen
(74) *Attorney, Agent, or Firm*—Steptoe & Johnson LLP

(57) ABSTRACT

A flush mixing tank is provided with a flocculant mixing section in which a raw water a to be treated is introduced and a flocculant such as known aluminum sulfate or polychlorinated aluminum is injected, and then they are agitated and mixed; and a floc growing section through which flocculant injected water mixed with the flocculant passes, and the flocculant injected water is discharged as a floc treated water, but a water passing member, which is provided with a plurality of water through-holes for promoting the growth of the flocs in the flocculant injected water, is disposed in the floc growing section. Flocs of flocculant injected water can be rapidly formed, and growth of the flocs can be accelerated.

13 Claims, 3 Drawing Sheets

FLOCCULATION APPARATUS

BACKGROUND OF THE INVENTION

1. Field of the Invention

The present invention relates to a purification treatment system for clean and sewage water and various kinds of discharge water, and relates in particular to an improvement in a water treatment in which a flocculant is applied.

2. Description of the Related Art

A flocculation treatment has heretofore been widely used in a purification treatment for clean and sewage water, and various kinds of discharge water. Also in a rapid filtration method and a membrane filtration method which are employed in general water purifying treatments, the flocculation treatment is applied except for some clear water sources. For example, in a water purification system [refer to "Water supply facility design guideline (2000 edition), Publication office: aggregate corporation Japan Water Works Association, Issue (second edition): June, 2000, 150 pages ((3) rapid filtration method), page 187 (5. 4. 3 flocculation basin)], illustrated in FIG. 3, a raw water 10, after running through a raw water tank 11, is injected with a flocculant 16 and mixed with it for about several minutes in a flush mixing tank 12, and then sent to a flocculation basin 13. Flocs grow larger as the flocculant injected water is slowly agitated in the flocculation basin 13. For this, it took 10 to 40 minutes.

Subsequently, treated water needs, for example, about 20 to 40 minutes to be sent to a sedimentation basin 14 for sedimentation and separation of bulky suspended solid (it is hereinafter referred to as SS), and small SS is filtrated in a next rapid filtration basin 15 and the like, thereby obtaining a filtrate 17. In addition, this filtrate 17 may sometimes be further subjected to a advanced treatment as necessary.

The coagulation treatment in such a water purifying treatment is for flocculating small SS particles and polymer dissolving components for easy separation. First, in the flush mixing tank 12, if the flocculant such as aluminum sulfate or poly aluminum chloride is injected into raw water and agitated, the minute SS particles and the like are electrically neutralized, thereby forming micro flocs. Then, this flocculant injected water is agitated by a system such as a mechanical agitating system or bypass flow system with an adjusted agitation intensity in the flocculation basin 13, which is set to grow the flocs larger so that they will have a size suitable for a subsequent sedimentation treatment, but there is a limitation in treatment capacity per facility area, making it difficult to reduce size.

On the other hand, as membrane filtration capability is being remarkably increased with technical development in ceramic membrane filtration, a membrane apparatus itself can be significantly reduced in size, but because a flush mixing tank and the flocculation basin require an equipment scale proportionate to a water formation amount, there has been a disadvantage that the equipment can not obtain a merit of scale if it is scaled up.

SUMMARY OF THE INVENTION

The present invention has been attained to solve the problems described above, and provides a flocculation apparatus capable of rapidly forming flocs of flocculant injected water, accelerating growth of the flocs, and reducing a size of equipment, in place of a conventional flocculation basin which requires a large installation space.

The present invention is based on findings that if water through-holes, enough for filtration and condensation of flocculation factors such as floc nucleuses or turbid materials in initial flocculation, are used and the flocculation factors pass through the water through-holes while being filtrated and condensed, flocs will progress in the short water through-holes. According to the present invention, there is provided a flocculation apparatus comprising: a flow path for a flocculant injected water in which a flocculant is injected and mixed into raw water, and a water passing member disposed in the flow path, the water passing member being provided with a plurality of water through-holes through which the flocculant injected water passes while causing condensation of flocs.

Furthermore, according to the present invention, there is provided a flocculation apparatus comprising: a tank, a flocculant mixing section disposed in the tank, a floc growing section disposed in the tank, and a water passing member disposed in the floc growing section, the water passing member being provided with a plurality of water through-holes, wherein a raw water and a flocculent are introduced and mixed in the flocculant mixing section to be a flocculant injected water, and the flocculant injected water passes through the floc growing section while causing condensation of flocs.

The flocculation apparatus of the present invention can be preferably implemented in an embodiment in which the water passing member is a ceramic honeycomb, and an embodiment in which the plurality of water passing members is arranged via spaces.

The flocculation apparatus of the present invention is capable of rapidly forming flocs of flocculant injected water, accelerating growth thereof, and reducing the size of equipment to less than half of that of a conventional flocculation basin. Moreover, the equipment itself has a simple configuration, and is easily manufactured, installed and maintained, and yet requires no energy such as electricity and less maintenance cost, thus decreasing costs. Furthermore, many beneficial effects are provided; for example, an adjustment can easily be made to achieve optimum flocculation by adjusting the number of stages in accordance with properties of raw water. Therefore, the present invention has a great technical value as the flocculation apparatus solving the problems of the prior art.

DETAILED DESCRIPTION OF THE PREFERRED EMBODIMENT

Figure 1:
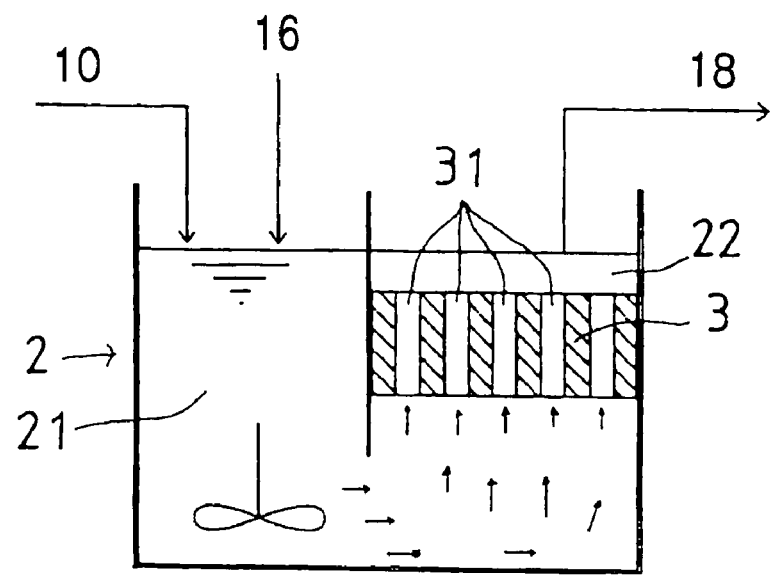
FIG. 1 is a schematic sectional view of essential parts for explaining an embodiment of the present invention.

Next, an embodiment of a flocculation apparatus of the present invention will be described referring to FIGS. 1 and 2.

In this embodiment, the present invention is implemented with a configuration in which a water passing member 3 for growing flocs is disposed inside a flush mixing tank 2 where a raw water 10 and a flocculant 16 are mixed. More specifically, it is characterized in that the flush mixing tank 2 is provided with a flocculant mixing section 21 in which the raw water 10 to be treated is introduced and the flocculent 16 such as known aluminum sulfate or polychlorinated aluminum is injected, and then they are agitated and mixed; and a floc growing section 22 through which flocculant injected water mixed with the flocculant passes while causing condensation of the flocs, and the flocculant injected water is discharged as a floc treated water 18, but the water passing member 3, which is provided with a plurality of water through-holes for promoting the growth of the flocs in the flocculant injected water, is disposed in the floc growing section 22.

Next, specific functional effects of the present invention will be illustrated. In a flow path (flow rate: 100 to 150 cm/minute) for the flocculant injected water which contains flocs having an average diameter of 10 to 20 μm, the water passing member 3 is disposed which is provided with a number of water through-holes 31 having an internal diameter of 1.8 to 8.0 mmφ, an open area ratio of 35 to 90%, and a length of 500 to 2000 mm. The flocculant injected water passes through the water through-holes 31 by cross flow circulation so that a condensation ratio on a membrane filtrated side may be 20 to 50%, and as a result, its flocs can be grown into a size having an average particle diameter of 60 to 150 μm. It has been found out from this result that a portion of a flocculation basin can be reduced to less than half in size.

In addition, a functional principle of the rapid growth of the flocs has not sufficiently clarified in the present invention, but is roughly as follows.

First, minute SS particles whose diameter is on a colloid level generally have a negative charge, and the raw water a, which stably exists without settling down due to a repulsive force, is introduced into the flocculant mixing section 21. When the flocculant b such as aluminum sulfate is injected into the flocculant mixing section 21, a charge of the SS particles is electrically neutralized by a positive charge (aluminum ions of aluminum sulfate) of the flocculant, and they flocculate due to disappearance of the repulsive force, thereby first forming micro flocs.

Next, the flocculant injected water is introduced into the adjacent floc growing section 22, and passes through the plurality of water through-holes 31 of the water passing member 3 disposed in a flow path for the flocculant injected water. In this case, as shown in FIG. 2, the flocculant injected water containing the micro flocs is dispersed by the through-holes when flowing into water through-hole entrances 31a which open on a lower surface of the water passing member 3, and it is thus surmised that the micro flocs more frequently contact each other, and that contacting efficiency of the flocs increases under a laminar flow in the through-holes, and that the growth of the flocs is promoted in combination with condensation effects of the flocs themselves. The water exits water through-hole outlets 31b into floc growing section 22.

In the case of the conventional flocculation basin, the agitation and bypass flow are performed so that the flocculant injected water flows at a slow flow rate of about 15 to 80 cm/second for growth of flocs having a large particle diameter. Therefore, only limited portions of micro flocs contact each other. In comparison, in the present invention, the flow rate is changed for the whole flocculant injected water to be treated, so that flocculation is supposedly achieved efficiently. Thus, when the flocculation is difficult in accordance with properties of treated water, it is preferable to address this problem by, for example, disposing the water passing member 3 to have a plurality of layers, that is, two or more layers, and decreasing the open area ratio at a downstream stage.

Figure 3:
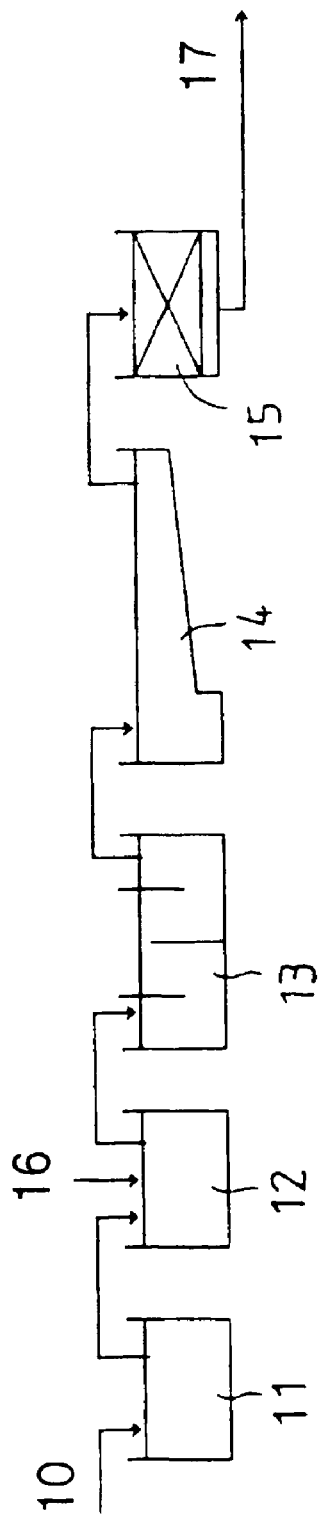
FIG. 3 is a schematic flow diagram showing one conventional flocculation treatment system.

In this example, the flocculant injected water runs upward through the water through-holes 31 since the grown flocs will be easily treated, but a water passing direction may be opposite and horizontal, or oblique for the floc growth. Then, the floc treated water d in which the flocs have sufficiently grown is introduced into the conventional sedimentation basin as illustrated in FIG. 3 to precipitate the flocs, thereby allowing the solid-liquid separation.

Figure 2:
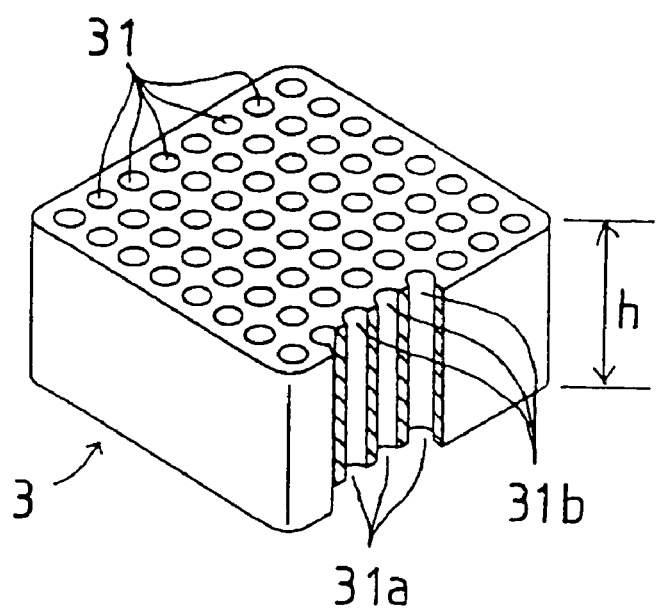
FIG. 2 is a partially lacking perspective view showing a water passing member used in the present invention.

Furthermore, in the case of FIG. 1, the flocculant mixing section 21 and the floc growing section 22 are integrally disposed in the flush mixing tank 2, but the present invention is not limited thereto, and it is naturally possible to separately dispose the flocculent mixing section 21 and the floc growing section 22.

In addition, a shape and material of the water passing member 3 of the present invention will be described. As described above, the water through-holes 31 disposed in the water passing member 3 suitably have an opening diameter of 1.5 to 8.0 mm, an open area ratio of 35 to 90%, and a water through-hole length of 500 to 2000 mm. If the water through-holes 31 depart from these ranges, water passing resistance increases and the flocs do not effectively grow, which is not preferable. In addition, the condensation ratio of the flocs is preferably set to 20 to 95% for satisfactory flocculation.

Furthermore, metals, synthetic resins or ceramics can be suitably selected for the material of the water passing member 3, but ceramics are preferred in terms of corrosion resistance, chemical resistance, weather resistance and the like. In this respect, it is preferable to apply a ceramic honeycomb material having a honeycomb or lotus root shape in which a number of communication holes are formed all over the front and back sides, or an aggregation in which a number of ceramic pipes are bundled.

Furthermore, in the present invention, the water passing member can also be used as a barrier filter for the flocculation and solid-liquid filtration so as to achieve a further size reduction of a flocculation treatment system.

More specifically, if a barrier filter in which a plurality of water through-holes is disposed in a porous ceramic material having countless filtration fine pores that does not allow SS to pass through, for example, a monolith type ceramic membrane filter, is used as the water passing member, those water through-holes will promote the formation and growth of the flocs in the flocculant injected water as described above, and owing to a differential pressure between the water through-holes and the outside, that filter will act as a membrane filter, whereby SS in the flocculant injected water including the flocs is separated, and filtrate can be obtained.

In this way, the monolith type ceramic membrane filter serves for both flocculation and solid-liquid filtration. In this case, the floc treated water d which has passed through the water passing member may be returned to the flocculant injection section 21 and repeatedly filtrated. Moreover, the obtained filtrate may further be subjected to a purification treatment such as advanced treatment at a subsequent stage as necessary.

Figure 4:
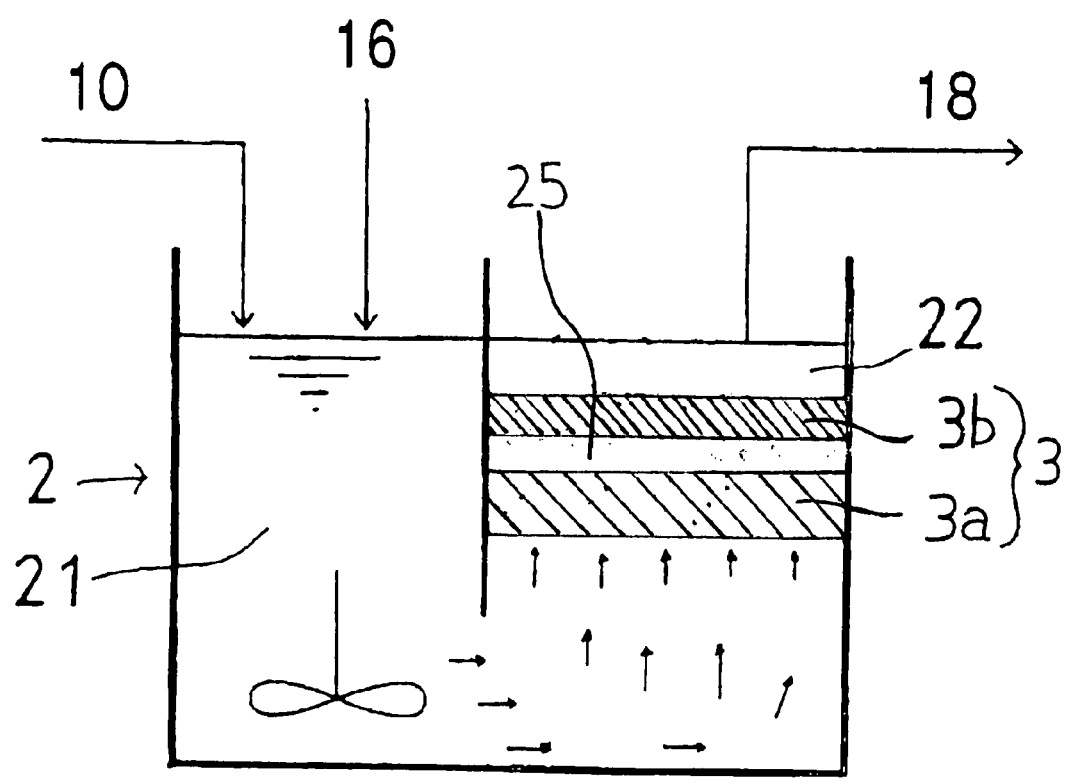
FIG. 4 is a schematic sectional view of essential parts for explaining an alternative embodiment of the present invention.

Referring to FIG. 4, a flocculation apparatus having a water passing member 3 with a plurality of layers 3a and 3b is shown (water through-holes 31 not shown). Second water passing member 3b is separated by a space 25 from first water passing member 3a. Second water passing member 3b is located downstream from first water passing member 3a and has a smaller open area ratio than first water passing member 3a.

What is claimed is:

1. A flocculation apparatus comprising:
a flow path for a flocculant injected water in which a flocculant is injected and mixed into raw water, and
a ceramic honeycomb water passing member located in the flow path, the water passing member including a plurality of water through-holes through which flocculant injected water passes causing condensation of flocs.

2. A flocculation apparatus comprising:
a tank,
a flocculant mixing section located in the tank,
a floc growing section located in the tank, and
a ceramic honeycomb water passing member located in the floc growing section, the water passing member including a plurality of water through-holes,
wherein a raw water and a flocculant are introduced and mixed in the flocculant mixing section into a flocculant injected water, and the flocculant injected water passes through the floc growing section while causing condensation of flocs.

3. The flocculation apparatus of claim 1, wherein said water passing member has an open area ratio of about 35 to about 90% a water through-hole length of about 500 to about 2000 mm, and a water through-hole diameter of about 1.5 to about 8.0 mm.

4. The flocculation apparatus of claim 2, wherein said water passing member has an open area ratio of about 35 to about 90% a water through-hole length of about 500 to about 2000 mm, and a water through-hole diameter of about 1.5 to about 8.0 mm.

5. A flocculation apparatus comprising:
a flow path for a flocculant injected water wherein a flocculant is injected and mixed into raw water;
a first water passing member located in the flow path, the water passing member including a plurality of water through-holes through which flocculant injected water passes causing condensation of flocs; and
a second water passing member including a plurality of water through-holes, located in the flow path after the first water passing member, said second water passing member having a smaller open area ratio than the first water passing member.

6. The flocculation apparatus of claim 5, wherein the second water passing member has a smaller water through-hole diameter than the first water passing member.

7. The flocculation apparatus of claim 5, wherein the first and second water passing members are separated by a space.

8. The flocculation apparatus of claim 5, wherein the first and second water passing members comprise a ceramic honeycomb.

9. The flocculation apparatus of claim 5, wherein the first and second water passing members are separated by a space, and wherein the first and second water passing members comprise a ceramic honeycomb.

10. A flocculation apparatus comprising:
a tank;
a flocculant mixing section located in the tank;
a floc growing section located in the tank;
a first water passing member located in the floc growing section, the water passing member including a plurality of water through-holes, wherein a raw water and a flocculant are introduced and mixed in the flocculant mixing section into a flocculant injected water, and flocculant injected water passes through the floc growing section causing condensation of flocs; and
a second water passing member located in the flow path after the first water passing member, said second water passing member having a plurality of through-holes with a diameter smaller than the through-holes of the first water passing member.

11. The flocculation apparatus of claim 10, wherein the first and second water passing members are separated by a space.

12. The flocculation apparatus of claim 10, wherein the first and second water passing members comprise a ceramic honeycomb.

13. The flocculation apparatus of claim 10, wherein the first and second water passing members are separated by a space, and wherein the first and second water passing members comprise a ceramic honeycomb.

* * * * *